Patented Dec. 3, 1946

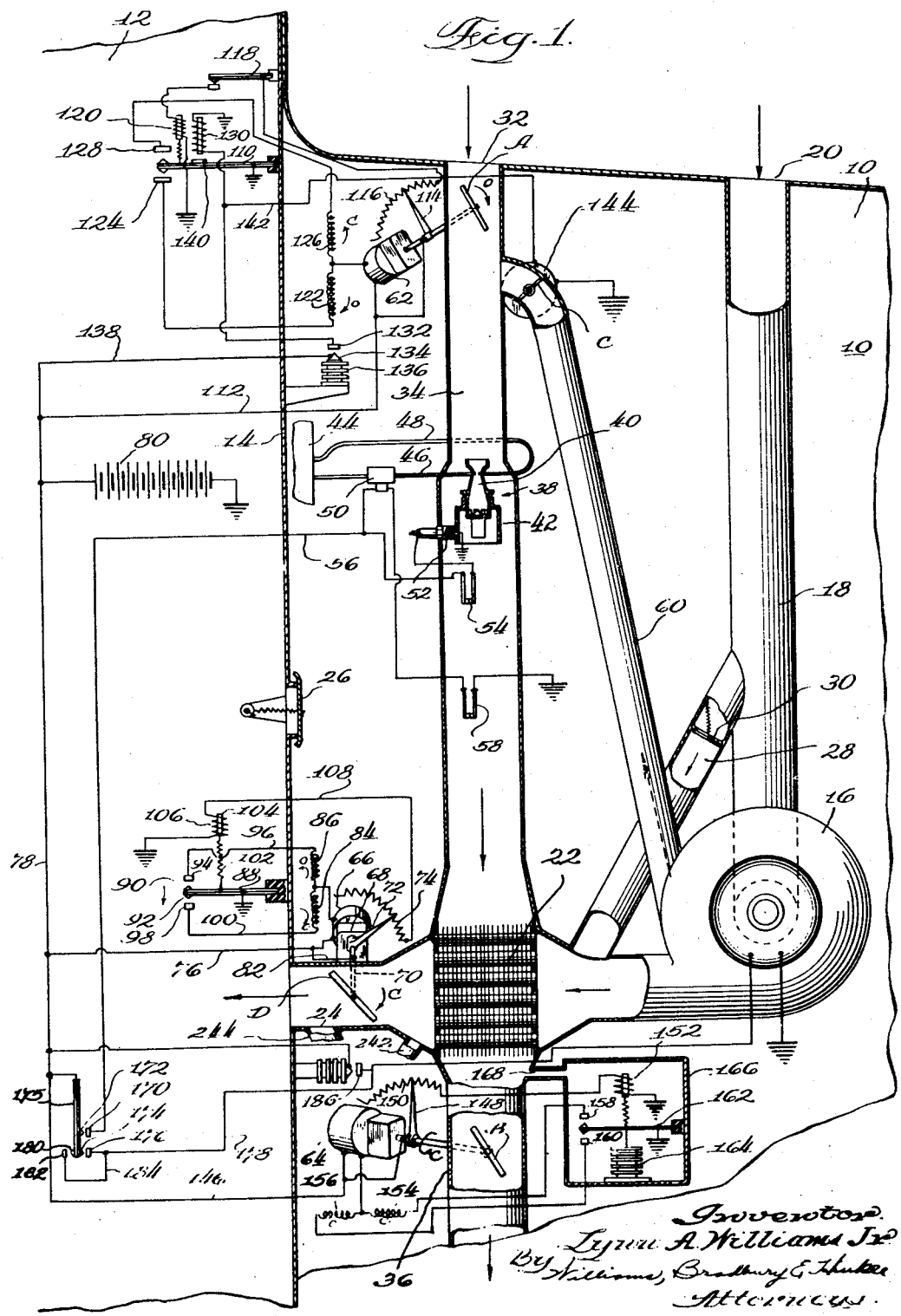

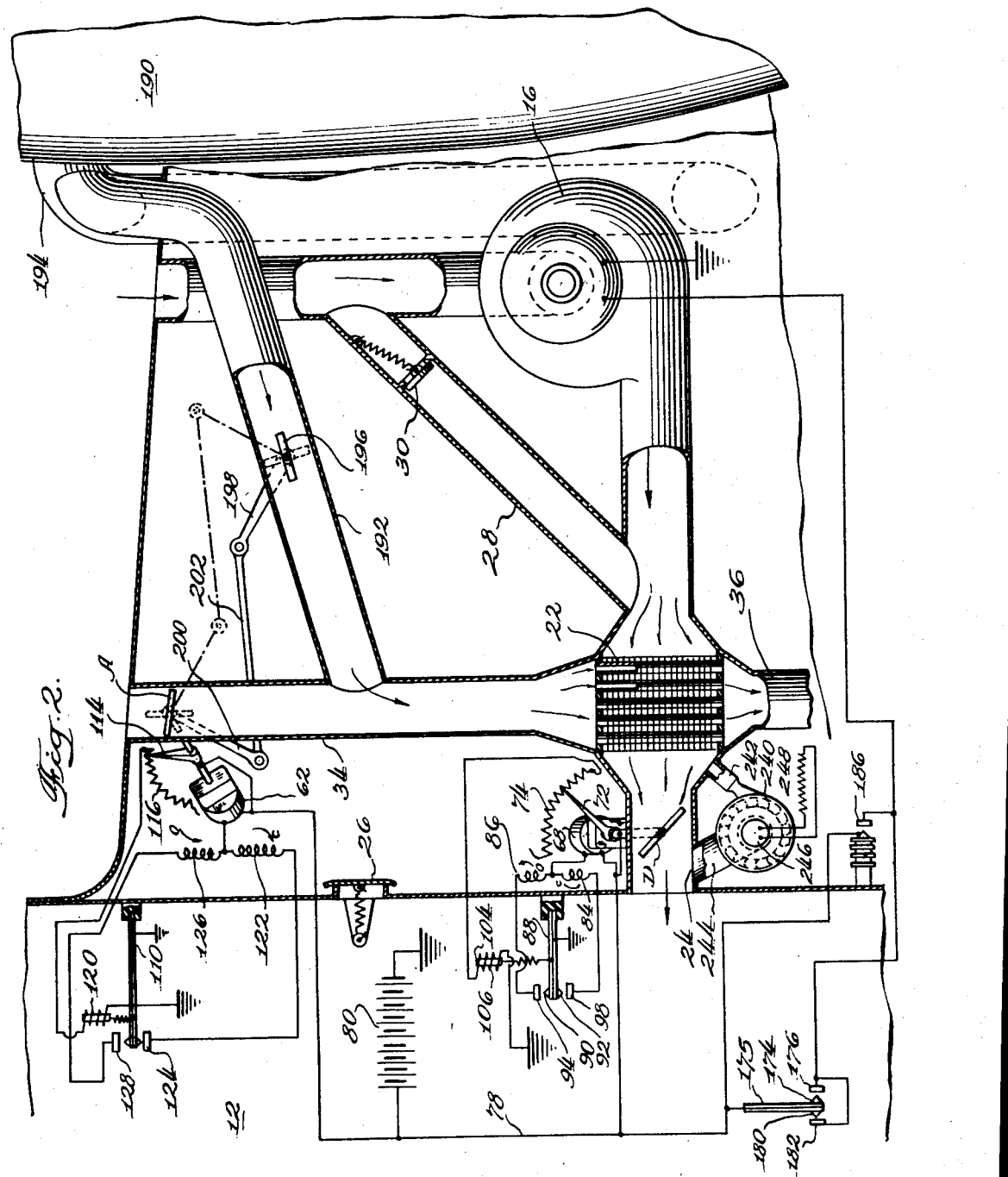

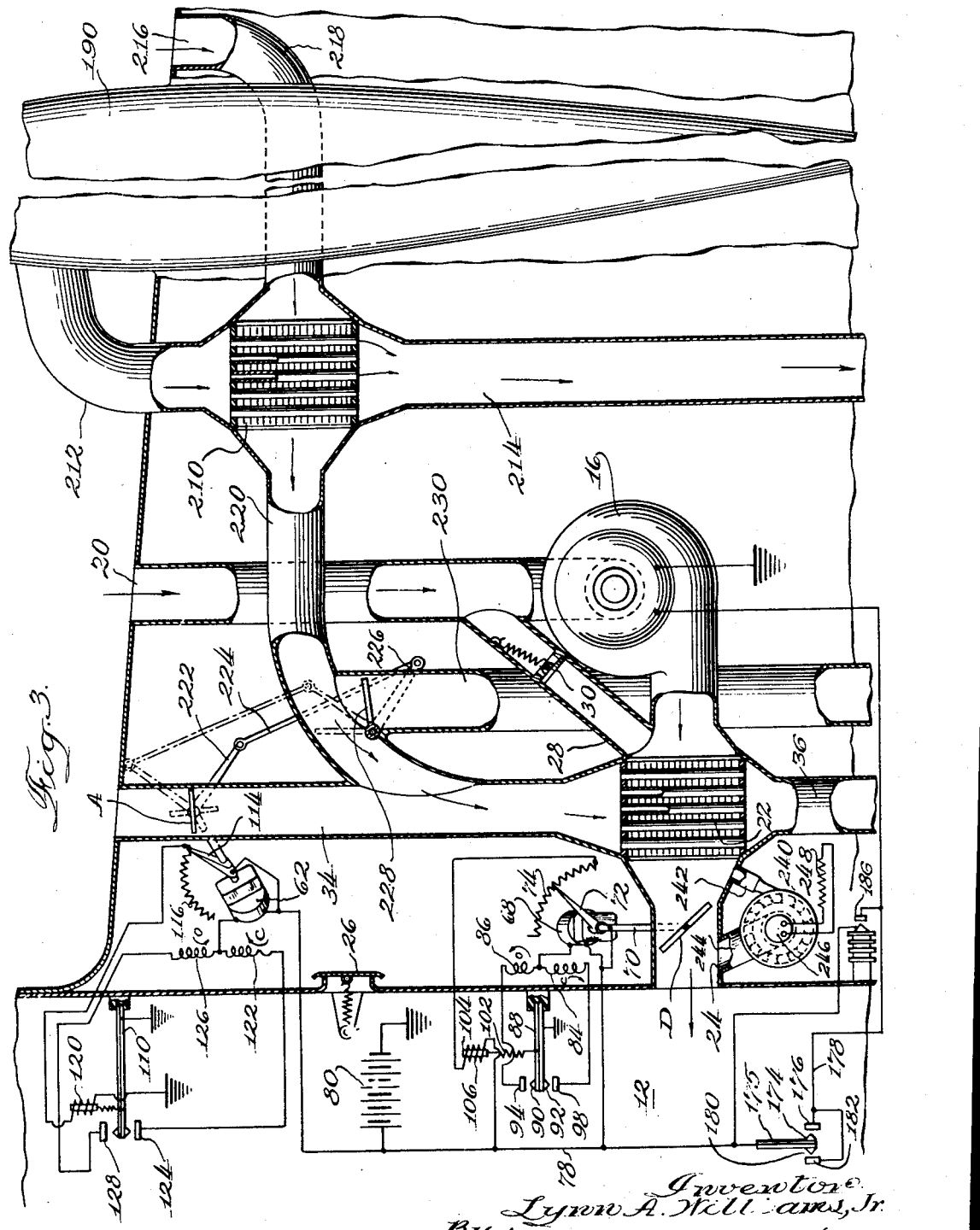

2,412,110

UNITED STATES PATENT OFFICE 2,412,110

AIR CONDITIONING APPARATUS FOR AIRCRAFT

Lynn A. Williams, Jr., Northfield, Ill., assignor to Stewart-Warner Corporation, Chicago, Ill., a corporation of Virginia Application February 4, 1943, Serial No. 474,632

21 Claims. (Cl. 257—3)

1

My invention relates generally to an air conditioning apparatus for use on aircraft, and more particularly to mechanism for maintaining the air in the cabin of an airplane at the desired temperature and pressure.

It is an object of my invention to provide an improved means for optionally heating or cooling the air supplied to supercharged aircraft cabins.

A further object is to provide an improved heating apparatus and improved controls therefor, to the end that the apparatus may be caused to operate efficiently under a wide variety of different atmospheric operating conditions.

A further object is to provide improved apparatus for supplying cool air to an airplane cabin.

A further object is to provide an improved heating apparatus with improved controls, whereby the apparatus will operate efficiently at high as well as low altitudes.

A further object is to provide an improved air heating and cooling system for aircraft which has few moving parts, which is light in weight, which is efficient and durable, and which may be economically manufactured.

Other objects will appear from the following description, reference being had to the accompanying drawings, in which:

Fig. 1 is a diagrammatic view of one form the apparatus may take, illustrated generally in plan section as installed in the wing of an airplane;

Fig. 2 is a view similar to Fig. 1 but showing an alternative air conditioning arrangement embodying the present invention; and Fig. 3 is a view similar to Fig. 2 illustrating still another alternative form the invention may take.

Maintaining the temperature of the air in an airplane cabin relatively constant and at a comfortable level presents many difficulties because of the wide variations in atmospheric temperature and pressure which are encountered while the airplane is in flight. These difficulties are augmented when the cabin is supercharged. In the latter case air is heated, due to its compression, by the supercharger before being passed to the airplane cabin. As will appear hereafter, this heating effect produced by the supercharger can be used for cooling the plane when the aircraft is cruising at low altitudes in hot weather.

In Fig. 1 of the drawings I have illustrated diagrammatically the leading edge portion 10 of an airplane wing near the root section where it joins the airplane fuselage indicated by the numeral 12, the wing and the fuselage being separated by the cabin wall 14. The cabin within the

2 fuselage is substantially sealed and is supercharged by a blower 16 which receives air from a pipe 18 leading to a ram opening 20 at the leading edge of the wing. With the blower 16 operating, air is forced through a heat exchanger 22 to a duct 24 leading to the supercharged cabin within the airplane fuselage, the pressure in the cabin being controlled by a cabin pressure regulating valve of any suitable type indicated diagrammatically at 26.

In order to provide ventilating air for the cabin at low levels where supercharging is not necessary, the blower 16 is by-passed by a conduit 28 having a check valve 30. This check valve permits air to flow through the by-pass 28 from the inlet pipe 18 to the heat exchanger 22 whenever the pressure in the pipe 18 rises substantially above the pressure at the outlet of the blower 16. The check valve 30 prevents flow in the reverse direction, however.

A second ram opening 32 located at the leading edge of the wing is connected to a duct 34 which passes air through the heat exchanger 22 in heat exchange relation to the air passed therethrough by the blower 16 or by-pass 28. Air from the duct 34, after passing the heat exchanger 22, continues to flow through a tailpipe 36 leading to an outlet in the air stream.

Whenever the airplane is flying at comparatively high altitudes and the blower 16 is operating, air will be taken into the blower at slightly above atmospheric pressure. This air will be compressed in the blower and will issue therefrom at an elevated pressure and temperature. If the air passes directly from the blower to the cabin and the cabin is maintained above atmospheric pressure, it will be apparent that the air thus passed to the cabin will be considerably above atmospheric temperature. Usually at high altitudes it is relatively cold and this heating effect is not objectionable. Under some conditions, however, the heating effect thus produced is more than desirable, and this excess heat is removed from the system by passing air at atmospheric temperature through the duct 34 across the heat exchanger 22, thus cooling the air before it reaches the cabin in the fuselage 12.

In order to heat air passed from the blower 16 to the cabin, I have placed a small internal combustion heater indicated generally by the numeral 38 in the duct 34. This heater includes a fuel mixing tube 40 connected with a combustion chamber 42. Liquid fuel, such as gasoline, is supplied from a suitable fuel tank 44 to the fuel mixing tube 40 through a pipe 46, the upper portion of the fuel tank being maintained under slight pressure by virtue of a pipe 48 which has an opening facing the ram 32, while the tube 46 may have a similar opening facing in the opposite direction to form a fuel jet aperture within the mixing tube 40. The flow of fuel through the pipe 46 is controlled by a solenoid valve 50 which may be of conventional type in which the valve is held in closed position by resilient means and is opened whenever the solenoid is energized.

Within the combustion chamber 42 is an igniter 52 of the hot resistance wire type, one terminal of the igniter being illustrated as grounded while the other terminal is connected through a temperature responsive igniter cutout switch 54 to a conductor 56. One terminal of the winding of the solenoid valve 50 is likewise connected with the conductor 56, while the other terminal of this winding is connected to ground through a temperature responsive overheat switch 58. As will appear presently, the conductor 48 is connected to a source of current in order that the heater may operate.

The heater, per se, does not constitute a part of my invention, but may be considered as of the type fully disclosed in the copending application of Henry J. DeN. McCollum, Serial 436,090, filed March 25, 1942.

Some heaters of this type do not operate effectively at extremely low barometric pressures and therefore should be supercharged for high altitude operation. The arrangement shown in Fig. 1 accomplishes such supercharging action, as will be pointed out presently. Other types of heaters, however, will operate effectively at any altitude at which an airplane can fly. If a heater of this latter type is used, certain portions of the apparatus shown in Fig. 1 may be omitted from the system, as will appear hereafter.

The heater 38 receives its air for combustion through the duct 34, the flow of air through this duct being controlled by a damper or valve A of the butterfly type.

The air in the duct is divided, a portion of this air passing through the heater 38 to be mixed with fuel and burned within the combustion chamber 42, the hot products of combustion issuing therefrom and mixing with another portion of the air which flows around the heater. The hot products of combustion mixed with additional air flow rearwardly across the tubes in the heat exchanger 22 and issue from the tailpipe 36. This tailpipe is equipped with a valve B which can be regulated in conjunction with the valve A in a manner to appear presently, to control the pressure of the air at the heater 38 and the rate of flow of air through the duct 34.

If the heater is of the type which requires supercharging in order to operate properly at high altitudes, it receives air for high altitude operation through a branch duct or conduit 60 leading from the blower 16 to the duct 34, the conduit being connected to the duct at a position between the valve A and the heater 38. This branch conduit is equipped with a valve C which can be regulated in conjunction with the valve A to determine whether the heater receives air for combustion from the ram 32 or from the blower 16.

The rate of flow of ventilating air through the duct 24 is regulated by a damper D which serves a purpose to be described presently.

The valves A, B and D are operated by small proportioning motors indicated respectively by the numerals 62, 64 and 66. These proportioning motors are standard articles of commerce, one type being supplied by the Barber-Colman Company of Rockford, Illinois, and although other types may be used, it will be assumed for the purpose of illustration that the control motors 62, 64 and 66 are "Barber-Colman" controllers.

In general, the mode of operation of these controllers is such that they automatically continuously cause the valve or damper to which they are connected to assume a desired position so as to maintain constant some certain temperature or barometric pressure. As an example, the motor 66 is of the series wound type and is connected to drive the input shaft of a speed reduction gear train 68. The output shaft 70 of this gear train revolves at low speed and high torque and is connected to the damper D. The output shaft is also connected to the swinging arm 72 of a variable resistor, the arm at its free end contacting a resistance coil 74. One of the motor armature brushes is connected by a wire 76 to a line 78 leading to one side of the aircraft storage battery 80. This wire 76 is also connected to the swinging arm 72 by a conductor 82. The other of the armature brushes is connected to the center of a split field, the two field coils being indicated by the numerals 84 and 86.

The above described portion of the controller comprises what is generally referred to as the receiving end of the circuit. The sending end of this circuit is shown to the left of the cabin wall and comprises a thermostatic switch made up of a bimetal strip 88 which at its free end is equipped with upper and lower contacts 90 and 92, respectively. These contacts are so arranged that when the strip 88 flexes upwardly the contact 90 will be brought against a contact 94 connected by a conductor 96 to the outer end of the field coil 86. Similarly, downward movement of the bimetal strip 88 brings the contact 92 against a fixed contact 98 connected by a conductor 100 to the outer end of the field coil 84. The bimetal strip 88 is biased in an upwardly direction to a varying degree by a coil spring 102 connected to the upper surface of the bimetal strip 88, the upper end of the spring being connected to a floating armature 104 located within a solenoid 106. This solenoid is connected by a wire 108 to the proper end of the resistance element 74. In the interest of simplicity of illustration, the opposite end of the solenoid 106 and the bimetal strip 88 are shown as grounded, as is one end of the battery 80, it being appreciated of course that a return circuit other than the ground can be used if desired.

A controller as above described operates in the following manner. If the bimetal strip 88 is so positioned that an increase in temperature will cause it to flex downwardly, it will be seen that such a temperature increase will bring the contact 92 against the contact 98. This establishes a circuit from the battery 80 through the connectors 78, 76 and 82 with the swinging variable resistor arm 72 and with one end of the armature 62. The circuit continues through the armature, through the field winding 84, and by way of the wire 100, contacts 98 and 92 to ground. The motor therefore will run in one direction. In the present instance this direction is such as to cause the valve D to swing toward closed position.

At the same time the motor circuit is energized as above described, the current will flow through the resistor arm 72, a portion of the resistance coil 74, through the conductor 108 and solenoid 106 to ground, thus energizing the solenoid 106 which tends to move the armature 104 upwardly, thus tightening the spring 102. As the motor continues to operate when connected in the manner above described, rotation of the shaft 70 will swing the damper D toward closed position and will also move the resistor arm 72 in the same direction, thus decreasing the resistance of the variable resistor 74. The decrease in resistance thus brought about permits a greater current to flow through the solenoid coil 106, with the result that the armature 104 is moved outwardly more strongly, thereby stretching the spring 102 and placing a greater bias upon the bimetal strip 88. After the motor has continued to operate for the proper length of time the attraction of the solenoid 106 for the armature 104 will overcome the temperature bias of the bimetal strip 88 and cause the strip to flex away from the contact 98 toward the contact 94. When the contact 98 is brought against the contact 94, a circuit is established through the other field coil 86, with the result that the motor 66 rotates in the opposite direction, thus tending to swing the damper D toward open position while also reducing the resistance of the variable resistor 74. The reduction in resistance thus brought about decreases the strength of the magnetic field in the solenoid 106, thereby reducing the upward bias on the bimetal strip 88. When the magnetic bias has been reduced some certain amount, the bimetal strip 88 will be able to pull the contact 98 away from the contact 94. The motor therefore continuously fluctuates in its direction of movement so as to position the damper D at approximately some predetermined position depending upon the temperature of the air surrounding the bimetal strip 88, it being appreciated that an increase in the temperature surrounding the bimetal strip will cause the bimetal strip to flex downwardly more strongly, thus requiring that a greater proportion of the resistor 74 be removed from the circuit before the contact 92 will separate from the contact 98.

Controllers of this type can be wired so as to cause a valve either to open or close, depending upon an increase or decrease in temperature, the controller 66 being connected to the valve D in such manner that an increase in temperature within the airplane cabin will tend to cause the valve D to close, while a decrease in temperature in the cabin will bring about an opening of the valve D.

Closing of the valve D tends to divert the flow in the conduit 24 through a rotary expander 240 (see Figs. 2 and 3). The inlet side of this rotary expander is connected to the conduit 24 upstream of the valve D by a pipe 242, while the outlet side of the rotary expander is connected to the conduit 24 downstream of the valve D by a pipe 244. In the present instance the rotary expander, which is of the turbine type, drives a generator 246 connected to a resistance type energy dissipating unit 248. The operation of this rotary expander in conjunction with the valve D will be explained presently.

The controller 62 connected to the valve A is so wired that a decrease in the cabin temperature will cause the bimetal strip 110 to flex downwardly, thereby causing the motor 62 to run in such direction that the valve A is swung toward open position. Conversely, an increase in cabin temperature will cause the valve A to move toward closed position. A wire 112 leading from the battery line 78 leads to one end of the motor armature 62 and to the swinging arm 114 of the variable resistor 116, the coil of this resistor being connected through a bimetal thermostat 118 with the solenoid coil 120. The thermostat 118, for a reason to appear presently, is adjusted so as to be closed whenever the temperature drops below 75°. As in the previous example, one of the field coils 122 is connected to the lower contact 124 in the sending unit, while the other field coil 126 is connected to the upper contact 128. The above system is so arranged that a decrease in temperature in the cabin tends to cause the bimetal strip 110 to flex downwardly, thus establishing a circuit through the field coil 122 and armature 62. This causes the motor to run so that the valve A is swung toward open position, whereas an increase in cabin temperature causes the bimetal strip 110 to flex upwardly thereby establishing the circuit through the armature 62 and field coil 126 with the result that the damper A is moved toward closed position.

The sending unit also includes a second electromagnet 130 grounded at one end and connected at its other end to a fixed contact 132 located adjacent a contact 134 moved under the influence of an aneroid element 136, the contact 134 being connected to the battery line 78 by a wire 138. The bellows, which elongates with a decrease in barometric pressure, is so adjusted in the present instance as to close the contacts 134 and 132 at an altitude of approximately 18,000 feet, thus establishing a circuit through the electromagnet 130. The electromagnet 130 is positioned above the bimetal strip 110 and acts upon an armature 140 secured to the upper surface thereof so as to cause the bimetal strip to move upwardly. The strength of the magnetic field developed by the electromagnet 130 is sufficient to overcome any tendency of the strip 110 to flex downwardly, and thereby maintains the bimetal strip in its uppermost position whenever the electromagnet is energized. This upward movement of the bimetal strip closes the circuit through the contact 128 to the field coil 126, with the result that the valve A is swung completely to its closed position and held in this position whenever the aircraft is over 18,000 feet, or some other predetermined altitude to which the pressure switch is set.

The contact 132 is also connected by means of a conductor 142 with a stalling motor 144, the shaft of which controls the valve C. This motor is so arranged that whenever it is not energized the valve C will be resiliently held in closed position, whereas whenever the motor 144 is energized the valve C will be swung into its open position. It is apparent, therefore, that whenever the contact 134 is brought against the contact 132 so as to swing the valve A into its closed position, the circuit thus established will simultaneously swing the valve C into its open position. Conversely, whenever the contact 134 is separated from the contact 132 so as to place the valve A under the influence of the cabin temperature thermostat, the valve C will be swung into its closed position.

The valve B is controlled by the motor 64 which receives its current through a line 146 connected to the main battery cable 78, this line 146 being connected to one end of the motor armature and to the swinging resistor arm 148. As in the previous example, one end of the resistance coil 150 is connected to ground through the solenoid 152, while the two field coils 154 and 156 are connected respectively to contacts 158 and 160. The contact-carrying strip 162, which in the previous examples is a bimetal temperature-sensitive strip, is in the present instance merely a resilient metal member biased upwardly by an aneroid bellows 164 at decreased barometric pressure, the strip 162 and the bellows being enclosed within a sealed chamber 166 connected by a tube 168 to the tailpipe 36 in a position above the valve B.

The wire 56 connected to the solenoid valve 50 and the igniter 52, leads to a contact 170 which is brought against a contact 172 on a bimetal strip 175 whenever the cabin temperature drops below approximately 70°. The bimetal strip 175 is in turn connected to the battery line 78, and therefore the heater operates whenever the cabin temperature falls below approximately 70° or some other temperature to which the device is preset. At the same time the bimetal strip brings the contact 172 against the contact 170, it also closes another set of contacts, 174 on the bimetal strip and 176 associated therewith. This contact 176 is connected to the motor of the blower 16 by a wire 178, the other side of the motor circuit being grounded. A set of contacts 180 and 182 arranged similar to the contacts 174 and 176 are disposed on the opposite side of the bimetal strip 175. They are so spaced that heating of the bimetal strip 175 to 78° or above will bring the contact 180 into engagement with the contact 182. A wire 184 leads from the contact 182 to the wire 178, with the result that the blower 16 will run whenever the temperature within the cabin is below 70° or above 78°.

The blower motor circuit also includes a pressure operated aneroid type switch 186 located outside the cabin, this switch being connected between the line 178 and the power line 78. The switch 186 in the present instance is adapted to close at approximately 12,000 feet altitude and to remain closed at higher altitudes. It is apparent, therefore, that the blower 16 will be placed in operation whenever the plane flies above 12,000 feet and whenever the cabin temperature is below 70° or above 78°. It will be understood that these particular pressures and temperatures are given for purposes of illustration only.

Although in the interest of clarity of illustration the mechanism has been shown diagrammatically, the several switches being illustrated as of the slow moving contact type, it will be appreciated that if desired many of these switches should preferably be of the "micro" or snap contact type, so as to give a fast and positive make and break to the circuits when the switches operate.

The operation of the above described air conditioning system is for convenience considered according to its functioning at different altitude and temperature conditions.

*Operation of the system at low altitude during temperate weather*

At low altitude the pressure operated switch 186 will be open, inasmuch as this switch does not close until the airplane rises to approximately 12,000 feet. Under these temperate weather conditions, which may be considered as between 70° and 78°, the thermostatic bimetal strip 175 will be spaced from both the contacts 176 and 182. Therefore the blower 16 does not operate, and the cabin will receive its ventilating air through the ram opening 20, the conduit 18, the by-pass 28, the passages through the heat exchanger 22, and the duct 24, this air passing outwardly through the cabin pressure control valve 26 or through other ventilator openings located within the airplane cabin.

Under these moderate temperature, low altitude conditions the heater 38 will not be energized, since the contact 172 does not touch the contact 170. Since the air conditioning system is used neither for cooling nor heating, the positioning of the valves A and B is unimportant and therefore need not be described. The valve C remains in its closed position since, as has been pointed out, this valve does not open until its motor 144 is energized by closing of the contacts 132 and 134 at 18,000 feet. The valve D fits comparatively loosely within the duct 24, so that even when this valve is in its closed position it will offer comparatively little restriction to the flow of ventilating air, inasmuch as the ventilating air circulation is at comparatively low velocity when the blower 16 is not operating.

From the above it is apparent that below 12,000 feet when the temperature is between 70° and 78° the apparatus functions purely as a ventilating system.

*Low altitude, cold weather operation of the system*

As the temperature decreases to a point below 70°, the free end of the bimetal strip 175 will move to the right, thus bringing the contact 172 against the contact 170 and the contact 174 against the contact 176. The making of these connections establishes a power circuit through the wire 178 to the blower 16, and another power circuit to the line 56, the solenoid 50 and the igniter 52. Opening of the solenoid valve permits fuel to flow to the heater 38, where it is mixed with air to form a combustible mixture, this mixture being ignited and burned within the combustion chamber 42 by the igniter 52. After operation of the burner has become established, the switch 54 will open to deenergize the igniter 52. Hot products of combustion, therefore, are passed through the duct 34 across the heat exchanger 22 and out through the tailpipe 36. Meanwhile operation of the blower 16 takes air from the duct 18 and forces it through the heat exchanger 22, through the duct 24, and into the airplane cabin, the air eventually escaping through the cabin pressure control valve 26 or other cabin ventilators.

The decrease in cabin temperature which closed the heater and blower motor circuits also tends to deflect the thermostatic strip 88 upwardly so as to establish a circuit from the power line 78 through the conductor 76 to the positioning motor 66, originally to the field coil 86. This causes the motor 66 to revolve the valve D toward open position. As this valve moves toward open position, resistance will be added to the circuit of the solenoid coil 106 because of the movement of the swinging arm 72 across the resistor element 74 until the decrease in magnetism within the solenoid 106 permits the armature 104 to move downwardly, thus permitting the contacts 90 and 94 to be separated.

The characteristics, therefore, of the thermostatic strip 88, the solenoid 106 and the resistor element 74 are such that at low temperatures the valve D is disposed well toward its open position, whereas at higher temperatures the valve D is located more toward its closed position. The valve D does not offer appreciable resistance to the flow of air through the duct 24, however, until the cabin temperature approaches the top of the comfort range, that is, 78°. As the temperature tends to rise above 78°, the valve will be swung more and more toward its closed position, thereby offering an increasing and appreciable resistance to the flow of air through the duct 24.

The decrease in cabin temperature which brought about starting of the heater and the blower 16 and which further tends to swing the valve D more toward its open position, also initially causes the thermostatic strip 110 to tend to move downwardly to establish a circuit through the motor 62 by way of the power line 78, the wire 112, the field coil 122, the contact 124, the thermostatic strip 110, and ground. This causes the motor 62 to revolve in such direction that the valve A is swung toward its open position. Thus, as in the case of the motor 66, the control system for the motor 62 is so arranged that the valve A tends to swing toward open position at lower temperatures, and conversely tends to close at higher temperatures.

Inasmuch as the output of the heater 38 depends largely upon the amount of air flowing through the duct 34, it will be seen that moving the valve A toward open position increases the heat output of the heater 38, whereas an increase in cabin temperature tends to swing the valve A toward closed position, thus decreasing the heat output. The amount of heat in the mixture carried across the heat exchanger 22 therefore is regulated so that more heat will be present to be transferred to the air passing from the blower through the duct 34 when the cabin temperature is low, whereas less heat will be present when the cabin temperature is high.

The thermostat which controls the motor 62 is set to maintain a cabin temperature somewhat less than 70°. That is, any tendency of the temperature to rise above this figure causes the motor 62 to swing the valve A toward closed position, while any tendency of the cabin temperature to drop will cause the valve A to be swung toward open position. This control therefore maintains an even cabin temperature at the preset value. If the airplane should move into more temperate conditions where the heater, even when operating at its lowest level, causes the temperature within the cabin to rise above approximately 70°, the bimetal strip 175 will move away from the contacts 170 and 176, thereby deenergizing the heater 38 and the blower 16.

*Operation at low altitude and high temperature*

Whenever the temperature rises above 78°, the bimetal strip 175 will be swung to the left against the contact 182, thereby energizing the blower 16. Under these high temperature conditions the thermostatic switch 118 will be open, inasmuch as this switch opens whenever the cabin temeprature rises above 75°. The solenoid 120 therefore cannot receive current, and the bimetal strip 110, since there is no pull thereon from above, will be deflected downwardly against the contact 124. This energizes the field coil 122, with the result that the motor 62 holds the valve A in wide open position. The flow of air through the duct 34 is therefore comparatively rapid, thus bringing a large quantity of air at atmospheric temperature into heat exchange relation to the air passing from the blower 16.

As has been explained, the bimetal strip 88 regulates the motor 66 in such manner that the valve D is swung toward closed position whenever the cabin temperature tends to increase. The valve D therefore offers considerable restriction to the flow of air from the blower 16 and diverts the air through the rotary expander 240. The ventilating air is therefore compressed into a condition well above atmospheric pressure between the blower 16 and the valve D. This compressing effect heats the air considerably above atmospheric temperature. As it passes through the heat exchanger, heat is exchanged from the air issuing from the blower to the air passing through the duct 34, with the result that the ventilating air flowing from the outlet side of the heat exchanger 22 is reduced substantially to atmospheric temperature but is under considerable compression. As the compressed air expands in the rotary expander and does work therein in rotating the turbine against the restraining effect of the generator 246, its temperature is considerably reduced, so that the air ultimately reaching the cabin is well below atmospheric temperature. The refrigerating effect thus produced reduces the cabin temperature well below that of the outside air, thereby insuring the comfort of the passengers in hot weather, the valve D automatically assuming whatever position is necessary to divert the proper amount of air through the rotary expander to secure the desired degree of cooling.

As the airplane flies from such hot conditions into more temperate weather, the valve D will be swung toward open position to reduce the refrigerating effect. When the cabin temperature falls below 78°, the switch 175 will open thereby deenergizing the blower 16.

*Operation of the system under temperate weather conditions at medium altitude*

As the airplane rises under temperate weather conditions, the surrounding pressure gradually is reduced until the switch 186 is closed at an altitude of approximately 12,000 feet. This starts operation of the blower 16, the cabin pressure being regulated by the cabin pressure regulating valve 26. The blower 16 therefore becomes a cabin supercharger. Inasmuch as air is taken into the blower 16 at atmospheric pressure and is passed to the cabin in a compressed condition—that is, the pressure of the air from the outlet side of the blower on through the duct 24 and into the cabin is above atmospheric pressure—considerable heating effect will be produced, since the air is not permitted to re-expand to atmospheric pressure until passing outwardly through the cabin pressure regulator 26. The heat exchanger 22, however, acts as an intercooler and tends to reduce the temperature of the supercharged air to slightly above atmospheric temperature. If at medium altitude—that is, around 12,000 feet or so—some additional cooling of the air is desirable, this will automatically be accomplished by the motor 66 swinging the valve D toward closed position, thus bringing about a flow of air through the rotary expander 240.

*Medium altitude, low temperature operation*

As the temperature at medium altitude drops below 70°, the bimetal strip 175 will move toward the right, thereby energizing the heater, thus causing the system to operate much as it does in cold weather at low altitudes. There is one difference in the operation, however, between the medium altitude zone and the low altitude zone, which is produced by the valve B and motor 64.

This motor is controlled by the pressure operated switch 162 located within the box 166 connected to the duct 34. The connections are such that as the pressure within the duct 34 drops because of the increase in altitude, the aneroid element 164 will expand, thereby swinging the valve B more toward its closed position. The result is that the valve B offers a restriction to the flow of air through the duct 34 on the outlet side. The ramming effect at the opening 32 therefore causes the air within the duct 34 to be well above atmospheric pressure. The valve B and motor 64 therefore cause more efficient operation of the heater 38 at higher altitudes.

High altitude operation of the system

As the airplane ascends to higher and higher altitudes, the valve B will be swung more and more toward its closed position so as to offer a progressively greater restriction to the flow of air from the tailpipe 36. However, the valve never completely obstructs the tailpipe 36, since its diameter is somewhat less than the diameter of the pipe, so that even when in its position of maximum obstruction the valve still permits a sufficient flow of air through the duct to permit efficient operation of the heater 38.

As the plane flies still higher, a position is reached at which the ramming effect at the opening 32, together with the obstructing effect of the valve B, is not sufficient to bring about efficient operation of the heater 38. When this point is reached, the aneroid element 136 has expanded until the contact 134 is brought against the contact 132. This energizes the electromagnet 130 in the manner previously described, which causes the bimetal strip 110 to move upwardly, thereby establishing the circuit to the control motor 62 through the field coil 126, regardless of the temperature within the cabin. This causes the motor to swing the valve A into its closed position and to maintain it in this position as long as the plane is above 18,000 feet. The closing of the contacts 132 and 134 which energize the electromagnet 130 also simultaneously brings about energization of the valve motor 144. As has been previously explained, this motor swings the valve C into its open position, thus permitting supercharged air to flow through the by-pass 60 into the duct 34. At these high altitudes the valve B is in the position where it affords maximum obstruction. The flow of air from the supercharger through the duct 60 therefore builds up a pressure within the duct 34, since the flow past the valve B is restricted and the valve A is closed. The heater 38 therefore continues to operate at altitudes well above those at which it would ordinarily be extinguished if it received unsupercharged air.

It is apparent that the above system provides ventilation for the cabin under all temperature and pressure conditions; further, that when supercharging is needed this supercharging is provided; also, that the air entering the cabin is heated or cooled when such temperature change is desired, all of the above operations being accomplished fully automatically.

The controls for the above described heating system presuppose that the heater 38 will not operate efficiently at low atmospheric pressures if it is adjusted for operation near sea level. There are available, however, heating units which will operate satisfactorily at any altitude at which airplanes normally fly. When such a heating unit is used, the controls shown may be greatly simplified. For instance, it is not necessary to provide the supercharging duct 60 or valve C, since supercharging of the heater will not be necessary. Since this duct and valve are not provided, the motor 144 is of course eliminated, as is the barometrically operated switch comprised of the elements 132, 134 and 136. Also there is no need for the electromagnet 130. When these elements are removed from the structure shown, it is apparent that the valve A will open progressively as the airplane cabin cools, thus introducing a larger quantity of air whenever it is needed for burning a greater quantity of fuel. The valve B may be used to advantage even with a heater which does not require supercharging, since it will aid in maintaining a higher pressure within the duct 34, thus increasing the heat output of the heating unit. If this increased output is not necessary, the valve B may be eliminated together with the motor 64 and the pressure sensitive control element and its box 166. Such a system operates in the manner previously described, excepting that the duct 34 is never supercharged and the air flow through this duct is regulated solely by the valve A.

In Fig. 2 of the drawings I have shown an alternative arrangement which uses the exhaust from an airplane engine located within an engine nacelle 190 for heating the ventilating air, this engine exhaust being used in place of the heater 38. In Fig. 2, instead of the duct 34 containing the heater 38, this duct is connected by a pipe 192 to the engine exhaust pipe 194 so that when the duct 192 is open, a portion of the engine exhaust will flow therethrough into the duct 34 and thence across the heat exchanger 22. The duct 192 is equipped with a valve or damper 196 supported upon a pivoting shaft connected in turn to a swinging arm 198. The valve A is similarly provided with a swinging arm 200, the free ends of the arms 198 and 200 being pivotally connected by a link 202. With this arrangement the motor 62 rotates the valve 196 as it rotates the valve A, the positioning of the valves A and 196 on their shafts being such that when one of these valves is in closed position, the other is in its open position. Thus, whenever the motor 62 swings the valve A from its closed position toward its open position, the valve 196 will be swung from its open position to its closed position. The operation of this system is essentially the same as shown in Fig. 1 excepting that whenever the cabin temperature drops below a comfortable level, say 70°, the thermostatic element 110 will operate to move the valve A toward closed position and the valve 196 toward open position, thus decreasing the flow of fresh air through the duct 34 and increasing the flow of exhaust gases. The temperature of the gases flowing over the heat exchanger 22 therefore increases, and more heat is imparted to the air passing from the blower 16 to the cabin 12. If more and more heat is required, the valve A will be moved more and more toward its closed position, thus moving valve 196 more and more toward its open position, thereby increasing the ratio of exhaust gases to fresh air passed over the heat exchanger 22.

As in the modification of the previous embodiment which uses a heater of the type which does not require supercharging, it is not necessary to provide the valve B and its associated control mechanism. Note, however, that whereas a decrease in cabin temperature in the device illustrated in Fig. 1 causes the damper A to open, a similar decrease in temperature in the embodiment shown in Fig. 2 causes the damper A to swing toward closed position, and therefore the thermostat 118 is not necessary. This reversal of the action of the valve A may be accomplished simply by positioning the damper A on its shaft at right angles to the position taken by this element in Fig. 1, so that when the resistor slider 114 is in the minimum resistance position the damper A in Fig. 2 will be in closed position whereas the damper A in Fig. 1 will be in open position.

In Fig. 3 I have shown an arrangement similar to that shown in Fig. 2 excepting that an intermediate heat exchanger 210 is used between the airplane engine exhaust and the duct 34. In the modification shown in Fig. 3, exhaust from the engine located within the nacelle 190 passes into an exhaust pipe 212 leading to the heat exchanger 210. From the heat exchanger the exhaust passes overboard to a tailpipe 214. Air to be heated is taken in through a ram opening 216 located at the leading edge of the wing, this air passing through a duct 218 and across the heat exchanger 210, thus absorbing a large portion of the heat from the airplane engine exhaust. The air as thus heated continues through a duct 220 and empties into the duct 34, where it passes across the heat exchanger 22 so as to heat the ventilating air passing from the ram opening 20 to the cabin 12.

As in the example shown in Fig. 2, the valve A is connected by means of a crank arm 222, a link 224, and a second crank arm 226 to a control valve 228 which regulates the flow of hot air from the duct 220 to the duct 34.

In order to prevent the heat exchanger 210 from overheating and burning out when hot air is not flowing from the duct 220 to the duct 34, the valve 228 is arranged to divert the hot air from the duct 220 into a branch duct 230, from whence it passes overboard. In other words, the valve 228, instead of being hinged at its middle so as to act merely as a damper, is hinged at one edge in such manner that when it moves upwardly to close off the connection between the duct 220 and the duct 34, it opens the connection between the duct 220 and the duct 230. Thus any desired portion of the hot air can be passed to the duct 34, the remaining portion passing overboard through the duct 230.

The system shown in Fig. 3 operates in a manner similar to that shown in Fig. 2, but has the advantage that exhaust gases cannot mix with the ventilating air passed to the cabin unless both of the heat exchangers 210 and 22 become perforated. For instance, a bullet or shell fragment passing through the heat exchanger 210 will permit some exhaust gases to pass into the duct 220. These exhaust gases, however, will not mix with the ventilating air unless the heat exchanger 22 is also perforated. Likewise, perforation of the heat exchanger 22 will permit air from the duct 220 to mix with the ventilating air but will have no disadvantageous effect so long as the heat exchanger 210 remains sound.

Products of combustion have a corrosive action upon some metals. It is preferable, therefore, that the heat exchangers through which burned gases flow be formed of stainless steel or some other heat and corrosion resistant material. The heat exchangers referred to are indicated by the numeral 210 in Fig. 3, and the numeral 22 in Figs. 1 and 2. Inasmuch as hot products of combustion do not pass through the heat exchanger 22 illustrated in Fig. 3, this element may be formed of aluminum alloy if desired.

From the above description of several embodiments of my invention, it will be apparent that the air conditioning system here shown and described provides ventilation for the airplane occupants at all times, supercharges the cabin when such supercharging is desirable, heats the ventilating air when the airplane is flying through a low temperature environment, and cools the ventilating air whenever the airplane encounters hot weather.

While I have shown and described a preferred embodiment of my invention, it will be readily understood by those skilled in the art that variations may be made in the construction disclosed without departing from the basic features of my invention. I therefore do not wish to be limited to the precise construction disclosed, but wish to include within the scope of my invention all such modifications and variations which will readily suggest themselves.

Having thus described my invention, what I claim as new and useful and desire to secure by Letters Patent of the United States is:

1. In an aircraft air conditioning system for an aircraft having a cabin, a cabin supercharger, a ram for supplying air to said supercharger, a conduit leading from said supercharger to the cabin, a heat exchanger in said conduit, a bypass connecting said ram with said conduit to deliver air to the cabin when the pressure differential between said ram and said conduit falls below a predetermined point, a cooling air duct for supplying air at substantially atmospheric temperature to said heat exchanger, and means for supplying a heated gaseous fluid to said cooling air duct.

2. In an aircraft air conditioning system for an aircraft having a cabin, a cabin supercharger, and a conduit leading from the supercharger to the cabin, the combination of a heat exchanger in said conduit, a liquid fuel burning heater, an air ram supplying air under pressure to said heater, a duct conducting air heated by said heater to said heat exchanger, means for conveying compressed air from said supercharger to said heater, valve means associated with said last named means and with said ram, and means responsive to atmospheric pressure for controlling said valve means to determine whether said heater shall receive air from said ram or from said supercharger.

3. In a heating system for aircraft, a liquid fuel burning heater, a ram supplying air for combustion to said heater, a heat exchanger deriving heat from the products of combustion of said heater, a conduit conveying the products of combustion from said heat exchanger to the atmosphere, and an adjustable valve in said conduit for controlling the back pressure on said heater whereby said heater will be supplied with sufficiently dense air for combustion when the aircraft is at high altitudes and thus maintain efficient combustion.

4. In an aircraft heating system, the combination of a liquid fuel burning heater, a ram for supplying combustion air to said heater, a supercharger, a conduit leading from said supercharger and connected to said ram for conveying air compressed thereby to said heater, a valve to shut off said ram, a valve to close said conduit, and means to cause opening of one of said valves when the other is closed.

5. In an aircraft heating system, the combination of a heating apparatus, means including an air ram for supplying combustion air to said apparatus, a supercharger, a conduit for conveying air compressed by said supercharger to said apparatus, a heat exchanger arranged to transfer heat from the products of combustion of said apparatus to air supplied by said supercharger, a duct conveying the products of combustion from said heat exchanger to the atmosphere, a first valve arranged to shut off the supply of air from said ram to said apparatus, a second valve arranged to control the flow of compressed air through said conduit, and a third valve arranged to restrict the flow through said duct, means for optionally operating said valves, and means to cause at least partial closure of said first valve whenever said second valve is opened.

6. The combination set forth in claim 5 in which there is a passageway for conveying air from said heat exchanger to a space to be heated and in which said passageway is provided with an optionally operable energy dissipating expander.

7. In an aircraft air conditioning system for an aircraft having a cabin, a cabin supercharger, and a conduit leading from the supercharger to the cabin, the combination of a heat exchanger in said conduit, means for supplying a heated fluid to said heat exchanger, means for supplying a cooling fluid to said heat exchanger, control means for respectively rendering said supercharger and said first or second means effectively operative, valve means in said conduit between said heat exchanger and the cabin for regulating the rate of flow through said conduit, and means responsive to the cabin temperature to move said valve means toward open or closed position.

8. In an aircraft heating system, the combination of a liquid fuel burning heater, a ram for supplying combustion air to said heater, a cabin supercharger, means for conveying compressed air from said supercharger to said heater, and valve means responsive to atmospheric pressure for determining whether said heater shall be supplied with combustion air from said supercharger or from said ram.

9. In a heating system for an aircraft having a space to be air conditioned and maintained above a predetermined pressure, the combination of a supercharger, a conduit conveying air under pressure from said supercharger to said space, a heat exchanger in said conduit, means responsive to the temperature of the air in said space to cause effective operation of said supercharger whenever the said temperature is above or below a comfort range, means to supply heated air to said heat exchanger whenever the temperature in said space is below said comfort range, and means effective to supply atmospheric air to said heat exchanger at a temperature lower than that of the air compressed by said supercharger whenever the temperature of said space is above said comfort range.

10. The combination set forth in claim 9 in which there is provided a valve and an energy dissipating cooler bypassing said valve in said conduit between said space and said heat exchanger, and means responsive to a temperature in said space above said comfort range to move said valve to a position substantially restricting flow through said conduit.

11. In an air conditioning system for an aircraft having a cabin and a cabin supercharger, a passageway for conveying compressed air from the supercharger to said cabin, an after cooler in said passageway, a normally ineffective energy dissipating cooler connected to said passageway between said after cooler and the cabin, and means responsive to an increase in the temperature of said cabin above a predetermined maximum value to render said energy dissipating cooler effective.

12. In an air conditioning system for an aircraft having a cabin and a cabin supercharger, a passageway for conveying compressed air from said supercharger to said cabin, a heat exchanger in said passageway, means to supply heated air to said heat exchanger, means to supply cold air to said heat exchanger, a normally ineffective energy dissipating cooler in said passageway between said heat exchanger and said cabin, and means to render said energy dissipating cooler effective whenever the temperature in said cabin rises above a predetermined value.

13. In a heating system for aircraft, a liquid fuel burning heater, means supplying air for combustion to said heater, a heat exchanger deriving heat from the products of combustion of said heater, a conduit conveying the products of combustion from said heat exchanger to the atmosphere, and an adjustable valve in said conduit for controlling the back pressure on said heater in response to atmospheric pressure.

14. In a heating system for aircraft having a cabin, the combination of a liquid fuel burning heater, a ram for supplying combustion air to said heater, a cabin supercharger, a conduit leading from said supercharger for conveying air compressed thereby to said heater, a valve to shut off said ram, a valve to close said conduit, and means responsive to atmospheric pressure to open the first said valve and to close the second said valve at a predetermined pressure altitude.

15. In an air conditioning system for an aircraft having a cabin, a cabin supercharger, a ram for supplying air to said supercharger, a conduit leading from said supercharger to said cabin, means responsive to the atmospheric pressure for controlling the operation of said supercharger, a by-pass connecting said ram with said conduit to deliver air to the cabin when said supercharger is not operating, a heat exchanger in said conduit, a cooling air duct for supplying air at substantially atmospheric temperature to said heat exchanger, and means for supplying a heated gaseous fluid to said cooling air duct.

16. In air air conditioning system for an aircraft having a cabin, a cabin supercharger, a ram for supplying air to said supercharger, a conduit leading from said supercharger to the cabin, means responsive to the cabin temperature for controlling the operation of said supercharger, a by-pass connecting said ram with said conduit to deliver air to the cabin when said supercharger is not operating, a heat exchanger in said conduit, a cooling air duct for supplying air at substantially atmospheric temperature to said heat exchanger, and means for supplying a heated gaseous fluid to said cooling air duct.

17. In an air conditioning system for an aircraft having a cabin, a cabin supercharger, a ram for supplying air to said supercharger, a conduit leading from the supercharger to the cabin, means responsive to atmospheric pressure for controlling the operation of said supercharger, means responsive to the cabin temperature to control the operation of said supercharger when the atmospheric pressure is above a predetermined pressure, a by-pass connecting said ram with said conduit to deliver air to the cabin when said supercharger is not operating, a heat exchanger in said conduit, a cooling air duct for supplying air at substantially atmospheric temperature to said heat exchanger, and means for supplying a heated gaseous fluid to said cooling air duct.

18. In a heating system for aircraft, means for compressing air, a ram in the air stream for receiving air, conduit means for conveying air from the ram to the compressing means, duct means for conducting air from the compressing means to an aircraft compartment, an intercooler in the last said duct means, heat exchange means for transferring a portion of the aircraft engine exhaust heat to an air stream to comprise a source of hot air, duct means for conducting hot air from said source to said intercooler, ram and duct means for collecting and conveying cool air to said intercooler, a dump passage connected to said hot air duct means upstream of said intercooler, and valve means for controlling the flow of hot air through said dump passage and for regulating the flow of hot and cool air through said intercooler.

19. In an aircraft air conditioning system for an aircraft having a cabin, a cabin supercharger, and a conduit leading from the supercharger to the cabin, the combination of a heat exchanger in said conduit, a duct for conveying air under pressure to said heat exchanger, said duct having a part thereof forming an air ram, a liquid fuel burning heater located in said duct, a second duct for conveying compressed air from said supercharger to said heater, and valve means associated with said second duct and with said air ram for determining whether said heater shall receive air from said air ram or from said supercharger.

20. In an aircraft air conditioning system for an aircraft having a cabin, a cabin supercharger, and a conduit leading from the supercharger to the cabin, the combination of a heat exchanger in said conduit, a liquid fuel burning heater, an air ram supplying air under pressure to said heater, a duct conducting air heated by said heater to said heat exchanger, means separate from said cabin for conveying compressed air from said supercharger to said heater, and valve means associated with said last named means and with said air ram for determining whether said heater shall receive air from said ram or from said supercharger.

21. In an aircraft air conditioning system for aircraft having a propelling means, a cabin, a cabin supercharger, and a conduit leading from the supercharger to the cabin, the combination of a heat exchanger in said conduit, a liquid fuel burning heater separate from said propelling means, an air ram supplying air under pressure to said heater, a duct conducting air heated by said heater to said heat exchanger, means for conveying compressed air from said supercharger to said heater, and valve means associated with said last named means and with said air ram for determining whether said heater shall receive said air from said ram or said supercharger.

LYNN A. WILLIAMS, Jr.